United States Patent
Choi et al.

(10) Patent No.: US 9,858,191 B2
(45) Date of Patent: Jan. 2, 2018

(54) ELECTRONIC SYSTEM WITH DATA MANAGEMENT MECHANISM AND METHOD OF OPERATION THEREOF

(71) Applicant: Samsung Electronics Co., Ltd., Suwon-si, Gyeonggi-Do (KR)

(72) Inventors: Inseok Stephen Choi, Redwood City, CA (US); Yang Seok Ki, Palo Alto, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 142 days.

(21) Appl. No.: 14/747,916

(22) Filed: Jun. 23, 2015

(65) Prior Publication Data

US 2016/0188477 A1 Jun. 30, 2016

Related U.S. Application Data

(60) Provisional application No. 62/099,075, filed on Dec. 31, 2014.

(51) Int. Cl.
*G06F 13/10* (2006.01)
*G06F 12/0862* (2016.01)
*G06F 3/06* (2006.01)

(52) U.S. Cl.
CPC ........ *G06F 12/0862* (2013.01); *G06F 3/0613* (2013.01); *G06F 3/0653* (2013.01); *G06F 3/0683* (2013.01); *G06F 2212/6028* (2013.01)

(58) Field of Classification Search
CPC .............. G06F 12/0862; G06F 3/0613
USPC ......................................... 711/137
See application file for complete search history.

(56) References Cited

U.S. PATENT DOCUMENTS

| | | | |
|---|---|---|---|
| 6,971,092 B1 * | 11/2005 | Chilimbi | G06F 11/3466 711/118 |
| 8,473,688 B2 * | 6/2013 | Allen | H04L 67/2847 710/40 |
| 8,775,775 B1 | 7/2014 | Ekambaram et al. | |
| 2004/0064648 A1 * | 4/2004 | Brown | G06F 12/0862 711/137 |
| 2013/0031459 A1 | 1/2013 | Khorashadi et al. | |
| 2014/0289332 A1 | 9/2014 | Frosst | |

FOREIGN PATENT DOCUMENTS

WO 2014028672 A1 2/2014

\* cited by examiner

*Primary Examiner* — Jae Yu
(74) *Attorney, Agent, or Firm* — IP Investment Law Group

(57) ABSTRACT

An electronic system includes: a master controller configured to: monitor an execution of a user program, and generate a pre-fetching hint; a cluster node, coupled to the master controller, configured to be a pre-processing client; a local storage, coupled to the cluster node, configured to store input data for the user program; and wherein the master controller is further configured to: transfer the pre-fetching hint to the pre-processing clients for pre-fetching a split of the input data from the local storage based on the pre-fetching hint.

20 Claims, 7 Drawing Sheets

ELECTRONIC SYSTEM WITH DATA MANAGEMENT MECHANISM AND METHOD OF OPERATION THEREOF

CROSS REFERENCE TO RELATED APPLICATION(S)

This application claims the benefit of U.S. Provisional Patent Application Ser. No. 62/099,075 filed Dec. 31, 2014, and the subject matter thereof is incorporated by reference herein.

TECHNICAL FIELD

An embodiment of the present invention relates generally to an electronic system, and more particularly to a system for data management functions for electronic systems.

BACKGROUND

Modern electronic systems rely on rapid execution of programs and manipulation of data. The majority of distributed cluster computing is based on dataflow programming models. Hadoop™ and Spark™ are representative examples of platforms for distributed cluster computing. One feature in the dataflow programming model is that data and worker mappings are predefined, allowing the execution to be deterministic. However, the parallel execution mismatching, deterministic execution information is missing outside the frameworks, causes Hadoop and Spark to not fully utilize data locality in their caching systems, OS page caches, and hardware cache/prefetcher.

For example, hardware prefetchers for CPU caches are usually based on a dump-truck technique, and this technique can deliver the data too early, too late or it can be the wrong data for execution. This can cause cache pollution, processor stall cycles, significant delays in the execution, and increased memory request activity that can disrupt all of the elements in a cluster computing environment. For the page caches, caching one-time read-only data pages will eventually over-write other more important pages, such as OS system libraries or system I/O files, resulting in node-wide performance degradation. Lastly, Hadoop's or Spark's native caching systems, for example, centralized cache management in HDFS, Tachyon caching, are not even aware of the deterministic execution information, losing opportunities for prefetching data into the cache structure.

Thus, a need still remains for electronic system with data management mechanism to improve execution reliability and performance in clustered computing environments. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a master controller including: an execution tracker unit, configured to monitor an execution of a user program, and a prefetching commander unit, coupled to the execution tracker unit, to generate a pre-fetching hint; a cluster node, coupled to the master controller, configured as a pre-processing client; a local storage, coupled to the cluster node, for storing input data for the user program; and wherein: the master controller sends the pre-fetching hint to the pre-processing clients for pre-fetching a split of the input data from the local storage and remote storage based on the pre-fetching hint.

An embodiment of the present invention provides a method of operation of an electronic system including: providing a master controller including: monitoring an execution of a user program by an execution tracker unit, and generating a pre-fetching hint by a prefetching commander unit coupled to the execution tracker unit; configuring a cluster node, coupled to the master controller, as a pre-processing client; storing input data for the user program in a local storage coupled to the cluster node; and pre-fetching a split of the input data from the remote storage, local storage and memory based on the pre-fetching hint sent by the master controller to the pre-processing clients.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
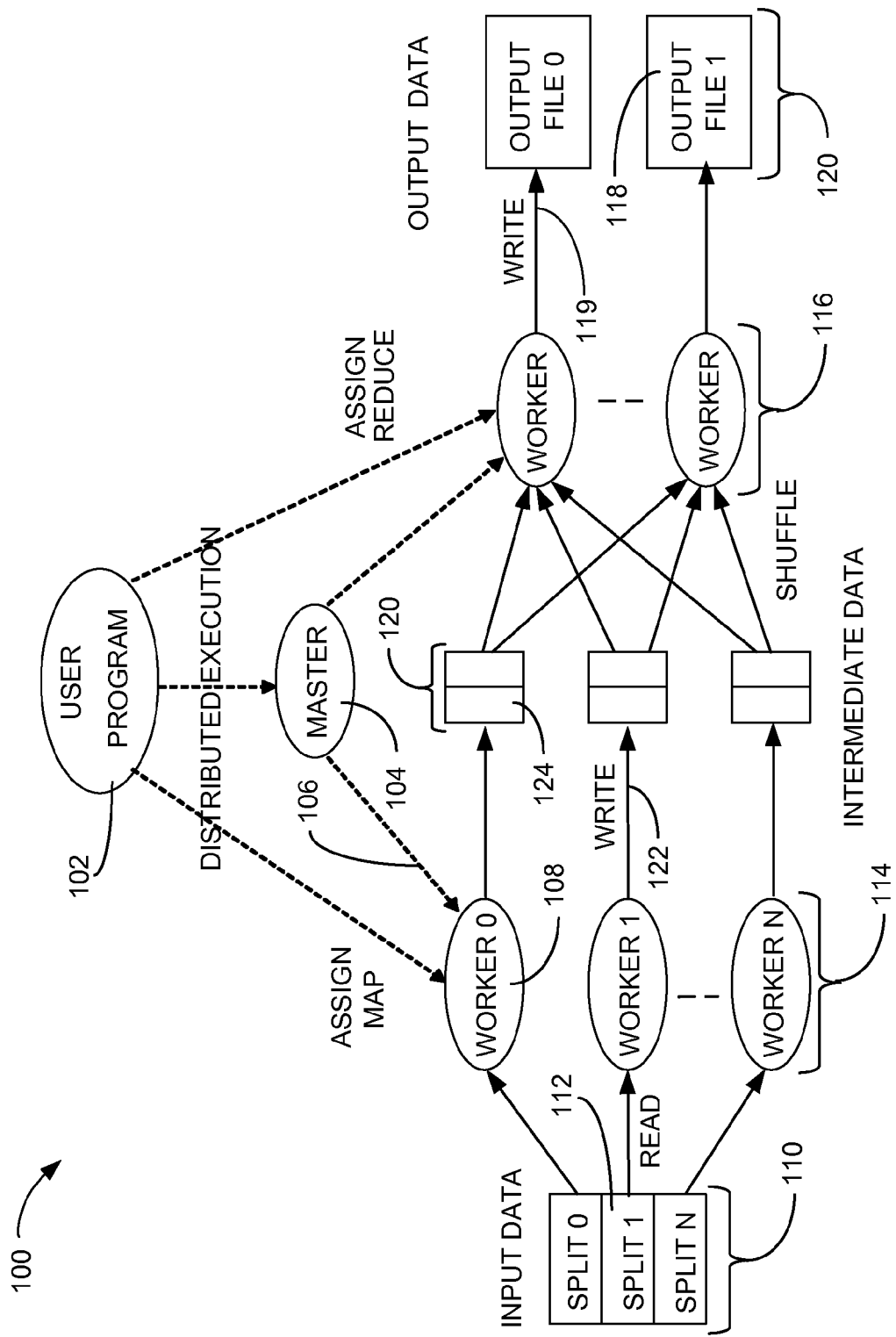
FIG. 1 is an architectural block diagram of an electronic system with data management mechanism in an embodiment.

Various embodiments provide a data pre-fetching mechanism for distributed cluster computing that can simplify the distributed input/output (I/O) interface and maximize the execution efficiency of the electronic system by establishing static pre-fetching hints delivered to a node prefetching engine. The static pre-fetching hints can be estimated based on the distributed processing by a plurality of cluster nodes configured to process a portion of the data used in a user program. The execution of the static pre-fetching hints can be monitored and analyzed in order to generate and adjust dynamic pre-fetching hints that can minimize the activity at the remote storage, local storage, and memory and provide the maximum program execution efficiency.

Various embodiments provide a new data pre-fetching mechanism for a distributed cluster computing framework based on a data flow model that generates hints to pre-fetch data based on a program graph to send pre-fetch hints to the cluster nodes. The data pre-fetching mechanism also monitors and profiles task behavior based on the generated hints. The cluster nodes include a pre-fetch engine for cache-level and memory-level pre-fetching without accessing the local storage. The cluster node can monitor task progress with appropriate granularity and trigger pre-fetching based on adjusting dynamic pre-fetching hints generated from the task behavior during execution of the tasks.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The term "unit" referred to herein is a circuit formed of hardware components or hardware state machines used for specific functions that are timing critical and do not include software functions or support.

Referring now to FIG. 1, therein is shown an architectural block diagram of an electronic system 100 with a data management mechanism in an embodiment. The electronic system 100 includes a user program 102, such as an application program. The user program 102 can be used for data processing in a distributed cluster computing environment.

A master controller 104 can analyze the user program 102 for assigning repetitive tasks 106 across a number of cluster nodes 108. Although this figure shows a map-reduce embodiment, these concepts can be used in other dataflow programming systems such as Spark. The master controller 104 can be a processor, a microprocessor, a core processor, a computer, or a server, that can parse the user program 102 and coordinate the execution by the cluster nodes 108. The cluster nodes 108 can be a processor, a microprocessor, a core processor, a computer, or a server, that can be assigned a repetitive task that is a portion of the user program 102.

Input data 110 typically resides in distributed file system, such as HDFS, but not necessarily. The input data 110 can reside in any kind of storage which is accessible from the framework. The cluster nodes 108 assume that the input data 110 is copied to the local storage of the cluster node 108 that executes the workflow, so the cluster node 108 includes its local storage while 120 can be the local storage for data write for each worker. The master controller 104 can plan the parsing of input data 110 into splits 112. The splits 112 can be a portion of the input data 110 that applies to the particular task assigned individually to the cluster node 108. The input data 110 can be parsed to allow each of the cluster nodes 108 to perform the same process on the input data 110 within its assigned split 112. The input data 110 can be all of the data that is required to process the user program 102 to a successful completion.

It is understood that any number of the cluster nodes 108 can be managed by the master controller 104. The master controller 104 can assign a number of pre-processing clients 114 and post-processing clients 116. The pre-processing clients 114 can be the cluster nodes 108 that are assigned to process the split 112 from the input data 110 for generating intermediate data 122. The intermediate data 122 can be the first partial result of processing the input data 110, for the user program 102, by the pre-processing clients 114. In the case of changed mappings between a data split and a node due to any kind of failure, the new mapping, DAG, and other metadata information can be updated at each client.

The post-processing clients can be the cluster nodes 108 that are assigned to process the intermediate data 122 and generate processed data 119 as a portion of the result of executing the user program 102 on the input data 110. In a deterministic mapping of the input data 110 and the pre-processing clients 114, the master controller 104 can assign a same or reduced number of the post-processing clients 116 to generate output files 118, from the processed data 119, to be stored in a local storage or local/remote storage comprising a distributed file system (e.g. HDFS) 120.

The local storage 120, can include non-volatile random access memory (NVRAM), solid state drives (SSD), or hard disk drives (HDD), can collect the intermediate data 122 in an input buffer 124. The input buffer 124 can be a specific portion of the local storage 120 dedicated to one of the pre-processing clients 114. The local storage 120 can be a shared storage structure used to provide a data exchange platform that can be allocated among the pre-processing clients 114 and shared between the post-processing clients 116. The input buffer 124 can be a portion of the local storage 120, allocated for use by one of the pre-processing clients 114, for storing the intermediate data 122. The local storage 120 can provide each of the post-processing clients 116 access to all of the input buffers 124, which can hold the intermediate data 122 processed by the pre-processing clients 114.

The master controller 104 can shuffle the intermediate data 122 through the local storage 120 to the post-processing clients 116 for further processing based on the requirements of the user program 102. The post-processing clients 116 can execute their limited assignment to generate the processed data 119. The processed data 119 can be a portion of the output files 118 that is generated by one of the post-processing clients 116. The compilation of the processed data 119 from the post-processing clients 116 can form the output files 118.

It is understood that the master controller 104 can provide a deterministic mapping of the input data 110 and the pre-processing clients 114 in order to provide an efficient execution of the user program 102. The master controller 104 can update the deterministic mapping of the input data 110 whenever the mapping has changed due to hardware failure or system performance degradation. Each of the pre-processing clients 114 can perform a specific task on the assigned split 112 of the input data 110. The coordination of the shuffle of the intermediate data 122 and the execution of the post-processing clients 116 can be coordinated by the master controller 104. The master controller 104 can utilize directed acyclic graph (DAG) and code analysis of the user program 102 in order to generate static pre-fetch hints in order to maintain the efficient execution by the electronic system 100. The master controller 104 can utilize monitoring and profiling of the execution of the pre-processing clients 114 and the post-processing clients 116 in order to generate dynamic pre-fetch hints that can assure the intermediate data 122 is available to the post-processing clients 116 in a timely manner.

It has been discovered that the electronic system 100 can utilize static pre-fetching hints and dynamic pre-fetching hints to coordinate the movement of the splits 112 of the input data 110 to the pre-processing clients 114 as well as the movement of the intermediate data 122 to the post-processing clients 116. The mechanism used by the electronic system 100 to generate the static pre-fetching hints and the dynamic pre-fetching hints will be discussed further in FIG. 2.

Figure 2:
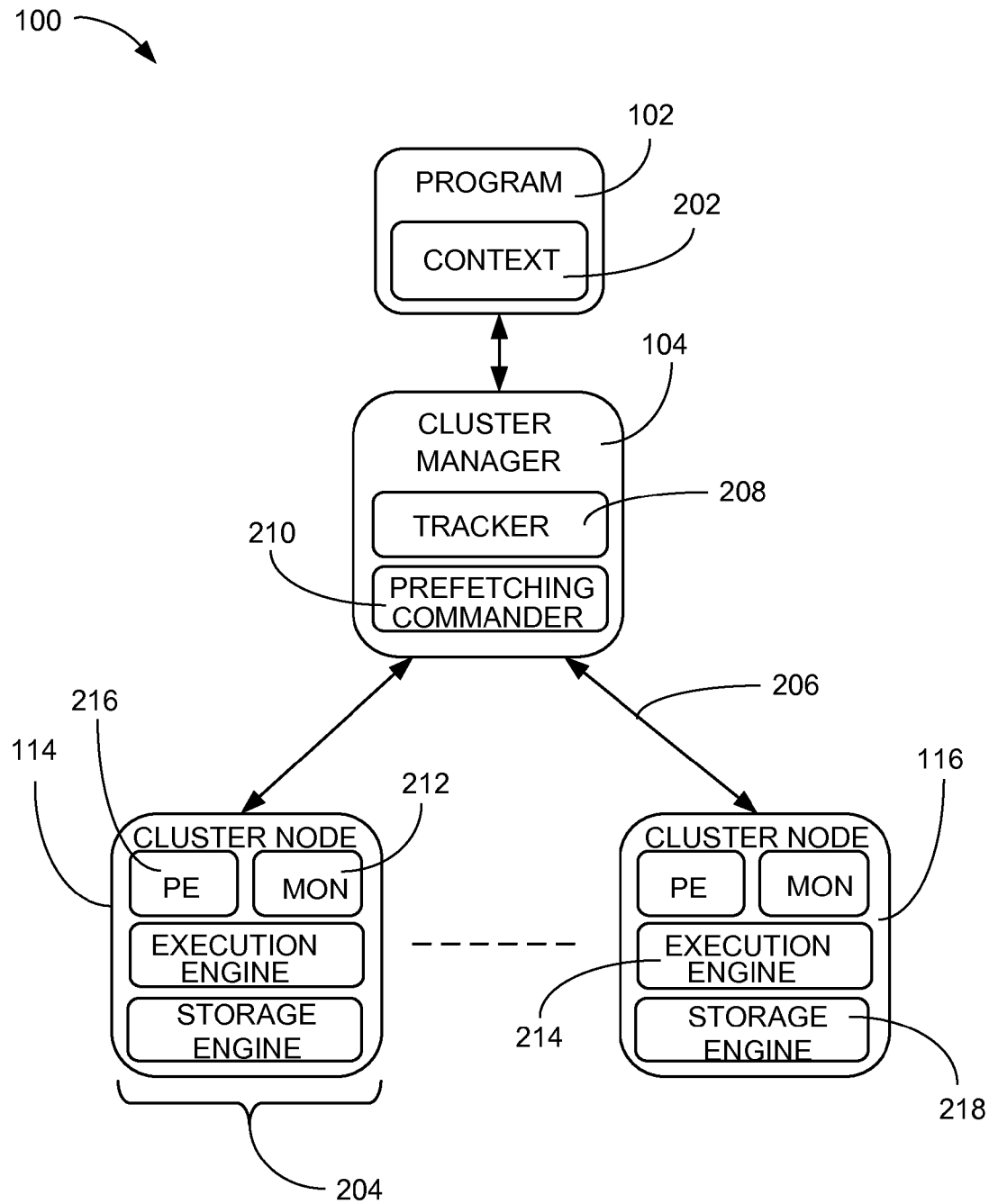
FIG. 2 is a functional block diagram of an electronic system with data management mechanism in an embodiment.

Referring now to FIG. 2, therein is shown a functional block diagram of an electronic system 100 with data a management mechanism in an embodiment. The functional block diagram of an electronic system 100 with data management mechanism depicts the user program 102 providing an execution context 202 for the master controller 104, such as a cluster manager or a coordinating controller. The execution context 202 can include a list of requirements that apply to the execution of the user program 102. The execution context 202 can specify an execution order of the routines within the user program 102. The master controller 104 can allocate a cluster node 204 as one of the pre-processing clients 114 or the post-processing clients 116 based on the needs of the execution context 202 in order to parse the user program 102 among the cluster nodes 204.

The master controller 104 can communicate with the cluster node 204 through a communication bus 206, such as a dedicated wired bus, a multi-connection bus, a network bus, or a wireless network connection. The master controller 104 can use the communication bus 206 to assign the cluster node 204 a limited task as the pre-processing clients 114 or the post-processing clients 116 and to monitor their progress in the execution of the limited task. The communication bus 206 can be a bidirectional bus for communicating assignments, status, and hints between the cluster node 204 and the master controller 104. Embodiments of the communication bus 206 can include a network, having a communication protocol, or a dedicated register port, in the cluster node 204, that can be written and read by the master controller 104.

An execution tracker unit 208, in the master controller 104, can monitor the status of the execution of the user program 102 by the pre-processing clients 114 and the post-processing clients 116. The execution tracker unit 208 can be coupled to a pre-fetching commander unit 210, for providing status and general performance data about the execution of the user program 102 in accordance with the execution context 202. The execution tracker unit 208 can construct a program graph to monitor the execution context 202 and instruct the pre-fetching commander unit 210 to construct the pre-fetching hints for minimizing an I/O bandwidth utilization of the local storage 120 of FIG. 1. The pre-fetching commander unit 210 can provide the static pre-fetching hints and the dynamic pre-fetching hints based on the execution of the user program 102 by the pre-processing clients 114 and the post-processing clients 116.

Each of the cluster node 204 can include a node monitor unit 212 that can be coupled to and maintain the status of a node execution engine 214, such as a processor, embedded processor, micro-processor, or server, as it executes the portion of the user program 102 assigned by the master controller 104. The node monitor unit 212 can track task progress at the cache-level granularity in order to notify the node pre-fetch engine 216. The node monitor unit 212 can determine an optimum pre-fetching distance in order to prevent over-running (thrashing) the cache located in a node storage engine 218. The node pre-fetch engine 216 can drive the node storage engine 218 for retrieving the splits 112 of FIG. 1 of the input data 110 of FIG. 1. The node storage engine 218 can include an on-board cache memory, execution memory, status memory, or a combination thereof. The node storage engine 218 can also include a storage interface that couples the cluster node 204 to the local storage 120.

The node pre-fetch engine 216 can be a hardware state machine, sequential logic processor, software or combinational logic that received input from the node monitor unit 212, the pre-fetching commander unit 210, and the execution tracker unit 208 for generating cache-level pre-fetch hints and memory-level pre-fetch hints in order to prevent cache pollution and instruction stalling.

The node storage engine 218 can be initialized by the master controller 104 based on the execution context 202 parsed from the user program 102. The pre-fetching commander unit 210 can send initial static pre-fetching hints to the node pre-fetch engine 216 based on the directed acyclic graph of the execution context 202. During the execution user program 102, the node pre-fetch engine 216 can receive updates from the execution tracker unit 208, the pre-fetching commander unit 210, and the node monitor unit 212 for generating the dynamic pre-fetching hints. The node storage engine 218 can write the intermediate data 122 of FIG. 1 or the processed data 119 of FIG. 1 depending on the assignment of the cluster node 204 as the pre-processing clients 114 or the post-processing clients 116.

It is understood that the input data 110, the intermediate data 122, and processed data 119 can be maintained in the local or remote storage 120, such as a network attached storage system, a random array of independent disks (RAID), direct attach storage devices (DASD), or tiered storage devices that are accessible to all of the pre-processing clients 114 and the post-processing clients 116 in the distributed cluster computing environment. The master controller 104 can be responsible for allocation of the storage capacity for the splits 112, the intermediate data 122, and the processed data 119, which forms the output file 118.

It has been discovered that an embodiment of the electronic system 100 can utilize the execution tracker unit 208 and the pre-fetching commander unit 210 to establish and adjust static pre-fetching hints delivered to the node prefetching engine 216. The node prefetching engine 216 can generate dynamic pre-fetching hints based on the input from the node monitor unit 212, execution tracker unit 208, and the pre-fetching commander unit 210. The ability to coordinate the access to the local storage 120 across all of the pre-processing clients 114 and the post-processing clients 116 can simplify the distributed input/output (I/O) interface and maximize the execution efficiency of the electronic system 100.

Figure 3:
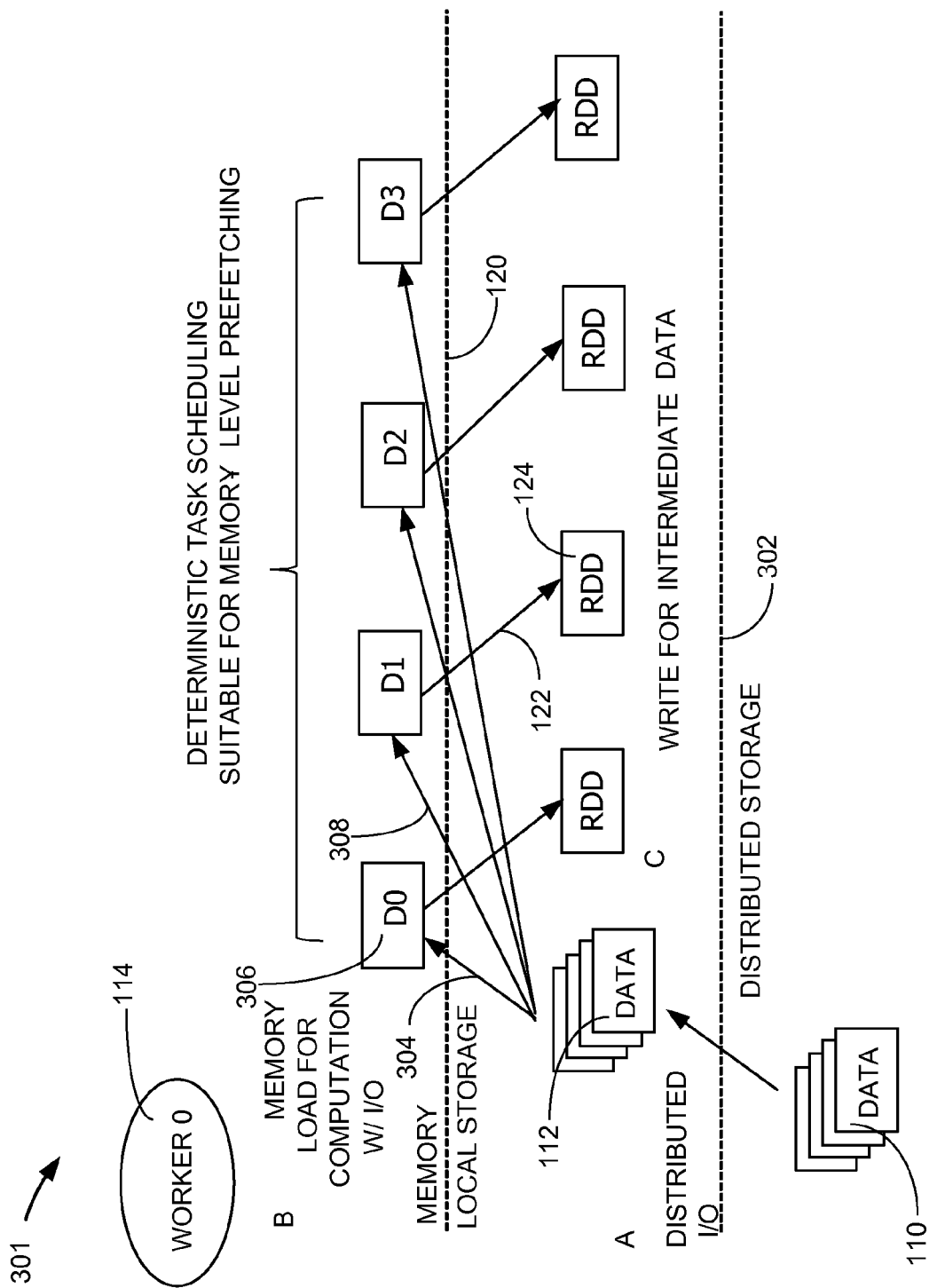
FIG. 3 is an example timing diagram of an electronic system with data management mechanism in an embodiment.

Referring now to FIG. 3, therein is shown an example timing diagram 301 of an electronic system 100 with data management mechanism according to an embodiment. The example timing diagram of an electronic system 100 with data management mechanism can include the input data 110 stored in a distributed storage device 302, such as a RAID system, network attached storage (NAS), or storage area network (SAN). The master controller 104 of FIG. 1 can assign the split 112 of FIG. 1 that is assigned to one of the pre-processing clients 114 identified as worker 0. The master controller 104 can provide the static pre-fetching hints that cause a first transfer 304 between the local storage 120 and a cache 306 within the node storage engine 218 of FIG. 2.

As the pre-processing clients 114 execute their portion of the user program 102 of FIG. 1, the node prefetching engine 216 of FIG. 2 can respond to the node monitor unit 212, which can construct a data-load sequence table (not shown) for profiling the data load pattern for the given task assigned by the master controller 104. The node monitor unit 212 can identify the execution pattern for the first transfer 304. Once the node monitor unit 212 has completed the data-load sequence table, the node prefetching engine 216 can provide dynamic pre-fetching hints to the node storage engine 218 in order to trigger a second transfer 308 as soon as the data from the first transfer 304 has been acted upon and before the intermediate data 122 is written to the input buffer 124. This pipelining of the data pre-fetching during the execution of the user program 102 can enhance the throughput without creating an I/O bottleneck in the local storage 120.

As the split 112 is processed through the pre-processing clients 114, the master controller 104 can initiate storage level pre-fetching from distributed storage 302 to local storage 120 with the input data 110. The appropriate data set for pre-fetching can be identified by:

$$\text{Pre-fetch } DS = a + (k*m) + i \quad \text{Equation (1);}$$

Where the Pre-fetch data set is identified because "m" is the iteration number, "i" is the number of the computation that requires the dataset, "a" is the number of pre-computation preparation datasets, and "k" is the number of datasets required for each iteration. Given that the master controller 104 is aware of the number of iterations required for the repetitive tasks 106 of FIG. 1, and the number of data sets required for each iteration, it can initiate the task-level pre-fetching of the input data 110 to the local storage 120.

The pre-processing clients 114 can implement the node prefetching engine 216 as a register-based pre-fetch control for cache-level pre-fetching and counter-based (producer-consumer) pre-fetch control for memory-level pre-fetching. An embodiment of the node prefetching engine 216 can provide high speed pre-fetching without bringing too much data into the memory level cache 306, which would inadvertently evict data that has not yet been processed. The node prefetching engine 216 can initiate cache-line prefetching by a strider prefetching algorithm by setting the strider distance for cache-line locations in the split 112.

Figure 4:
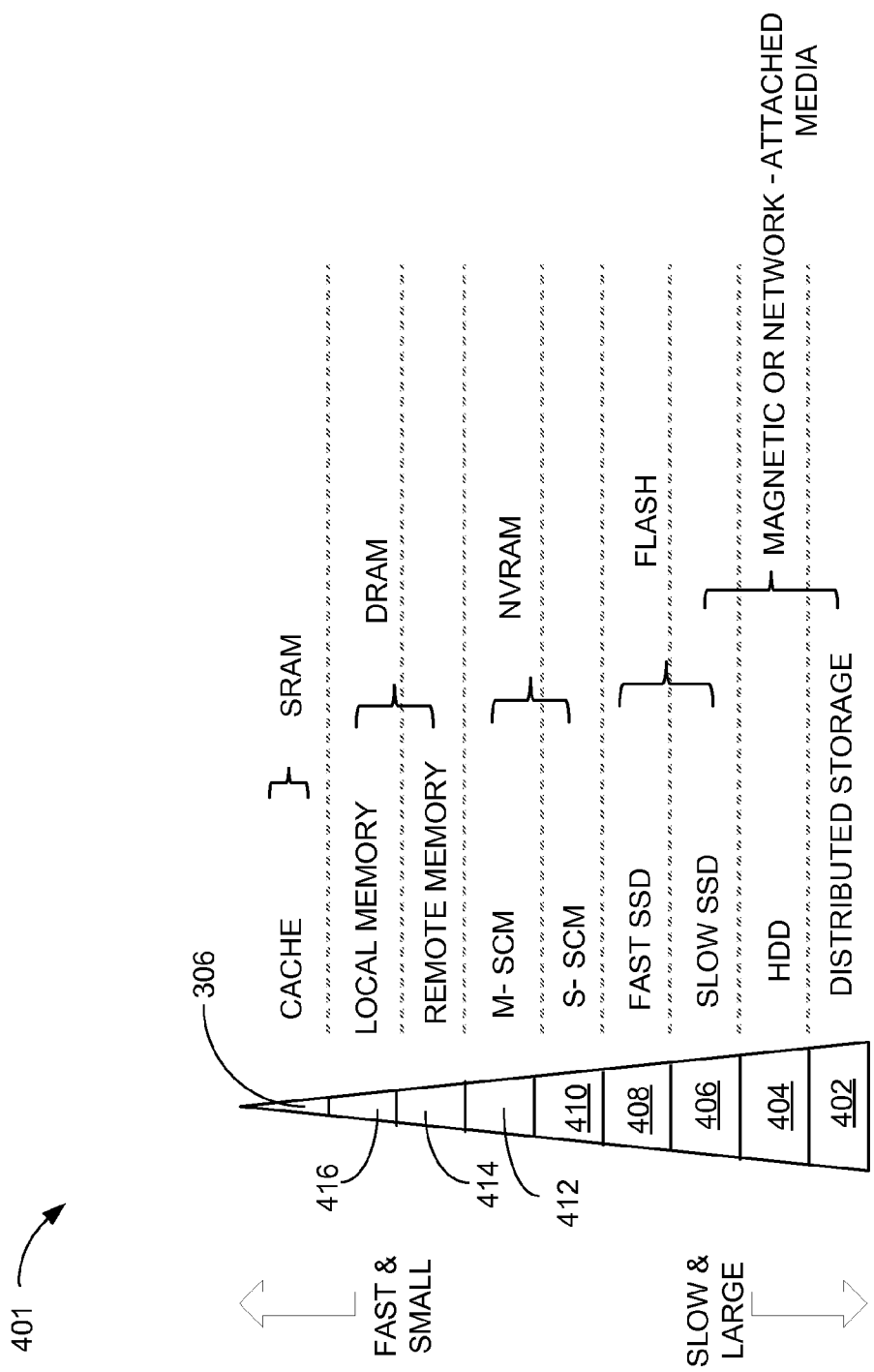
FIG. 4 is an example storage hierarchy drawing in an embodiment.

Referring now to FIG. 4, therein is shown an example storage hierarchy 401 in an embodiment. The example storage hierarchy 401 depicts a distributed storage structure 402, such as a RAID system, network attached storage (NAS), or storage area network (SAN). A local storage structure can include a hard disk drive (HDD) 404, a slow solid state drive (SSD) 406, a fast solid state disk (SSD) 408, and single bit per cell solid state memory 410.

A resident memory in the cluster node 204 of FIG. 2 can include a multi-bit per cell solid state memory 412, a remote dynamic random access memory (DRAM) 414, and a local DRAM 416. The fastest implementation in the storage hierarchy 401 is the cache 306. The combination of the master controller 104 of FIG. 1, having the execution tracker unit 208 of FIG. 2 and the node prefetching engine 216 of FIG. 2, and the cluster node 204 of FIG. 2, having the node monitor unit 212 of FIG. 2 and the node prefetching engine 216, implement an efficient mechanism for generating the static pre-fetching hints and the dynamic pre-fetching hints based on the overall performance of the I/O interface and the coordination of the pre-processing clients 114 of FIG. 1 and the post-processing clients 116 of FIG. 1.

Figure 5:
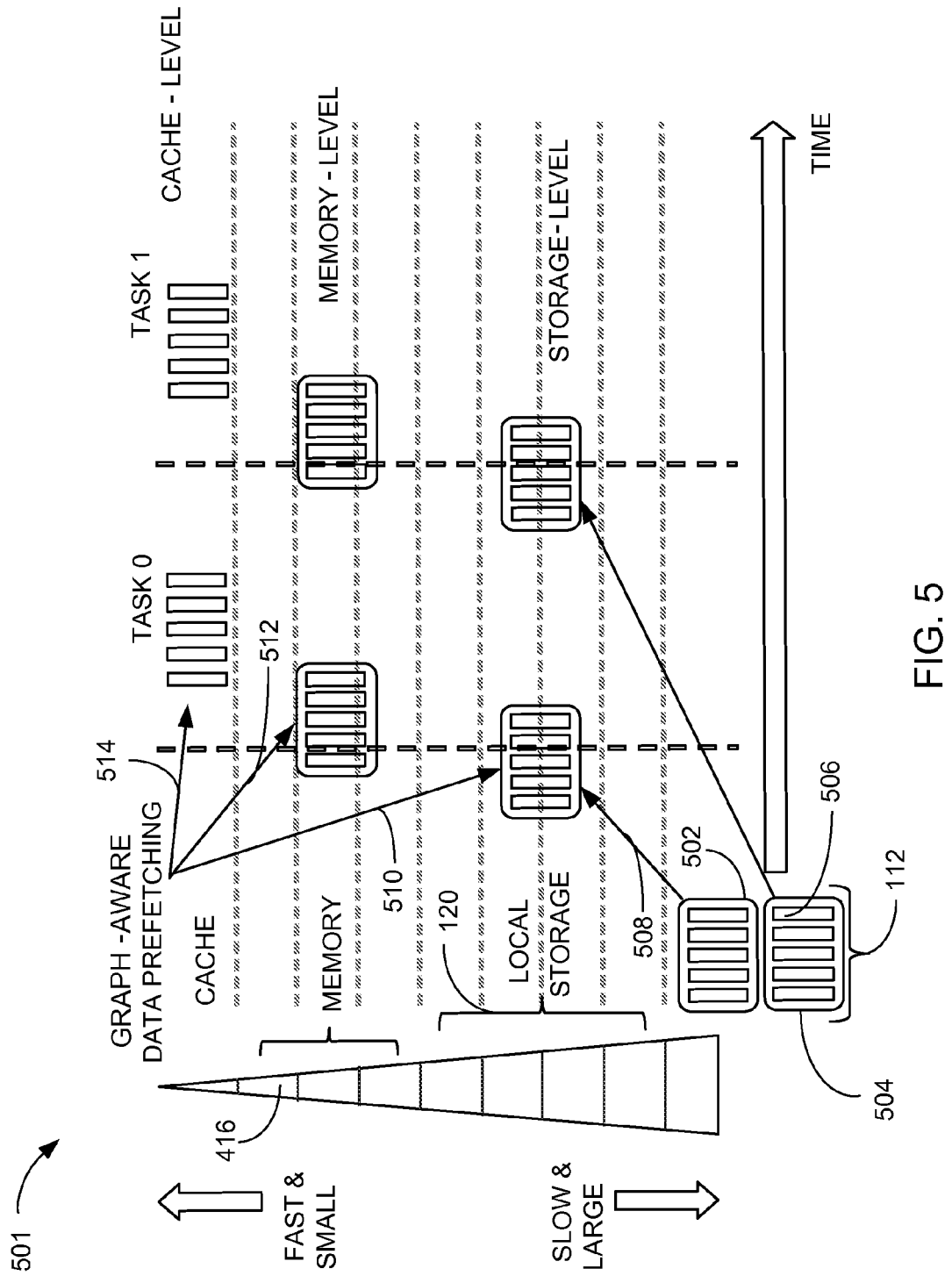
FIG. 5 is an example storage timing diagram of an electronic system with data management mechanism in an embodiment.

Referring now to FIG. 5, therein is shown an example storage timing diagram 501 of an electronic system 100 with data management mechanism in an embodiment. The example storage timing diagram 501 depicts that the split 112, held in the distributed storage structure 402 of FIG. 4, can have a first data block 502 and a second data block 504.

Each of the first data block 502 and the second data block 504 can contain a number of cache page loads 506. The master controller 104 of FIG. 1 can cause a storage-level pre-fetch 508 by the static pre-fetching hints delivered to the cluster node 204 of FIG. 2. The storage-level pre-fetch 508 can transfer the first data block 502 from the distributed storage 402 of FIG. 4 to the local storage 120 in preparation for executing the assigned portion of the user program 102 of FIG. 1. The subsequent occurrences of the storage-level pre-fetch 508 can be initiated by the pre-fetching commander unit 210 of FIG. 2 as dynamic pre-fetching hints to transfer the second data block 504 from the distributed storage 402 to the local storage 120. The local storage 120 can include the hard disk drive (HDD) 404 of FIG. 4, the slow solid state drive (SSD) 406 of FIG. 4, the fast solid state disk (SSD) 408 of FIG. 4, and the single bit per cell solid state memory 410 of FIG. 4 that is not contained within the cluster node 204.

It is understood that the number of the data blocks can be different. Only the first data block 502 and the second data block 504 is shown for clarity of discussion. Any additional transfers of additional data blocks (not shown) can operate as described for the second data block 504.

Once the first data block 502 is relocated to the local storage 406, the node prefetching engine 216 of FIG. 2 can issue a static pre-fetching hint 510 to the node storage engine 218 of FIG. 2 in order to load the first data block 502 into the local DRAM 416, which can be included in the node storage engine 218. The transfer between the local storage 120 and the local DRAM 416 can load the first data block 502 or only a portion of it, depending on the amount of the local DRAM 416 provided in the cluster node 204. The node storage engine 218 can decide to load a portion of the first data block 502 in a different memory level that is faster than the local storage 406 and is still available to the cluster node 204, such as the multi-bit per cell solid state memory 412 of FIG. 4 or the remote DRAM 414 of FIG. 4. The movement of the first data block 502 to a faster memory structure can reduce the I/O bandwidth requirement on the local storage 120, which can be accessed by more than one of the cluster nodes 204, and allow greater flexibility in the timing of dynamic pre-fetching hints 512, such as memory-level pre-fetching, generated by the node prefetching engine 216.

The node prefetching engine 216 can generate a cache-level pre-fetching hint 514 for the node storage engine 218 to move one or more of the cache page loads 506 into the cache 306 of FIGS. 3 and 4, within the cluster node 204. The cache 306 can be located within the node storage engine 218. The number of the cache page loads 506 that are loaded into the cache can depend on the overall performance of the cluster node 204 in executing the user program 102 of FIG. 1. The node prefetching engine 216 can generate additional dynamic pre-fetching hints 512 as the data within the cache page loads 506 is processed to become the intermediate data 122 of FIG. 1 or the processed data 119 of FIG. 1. The generation of the dynamic pre-fetching hints 512 can continue through the execution of the user program 102.

Figure 6:
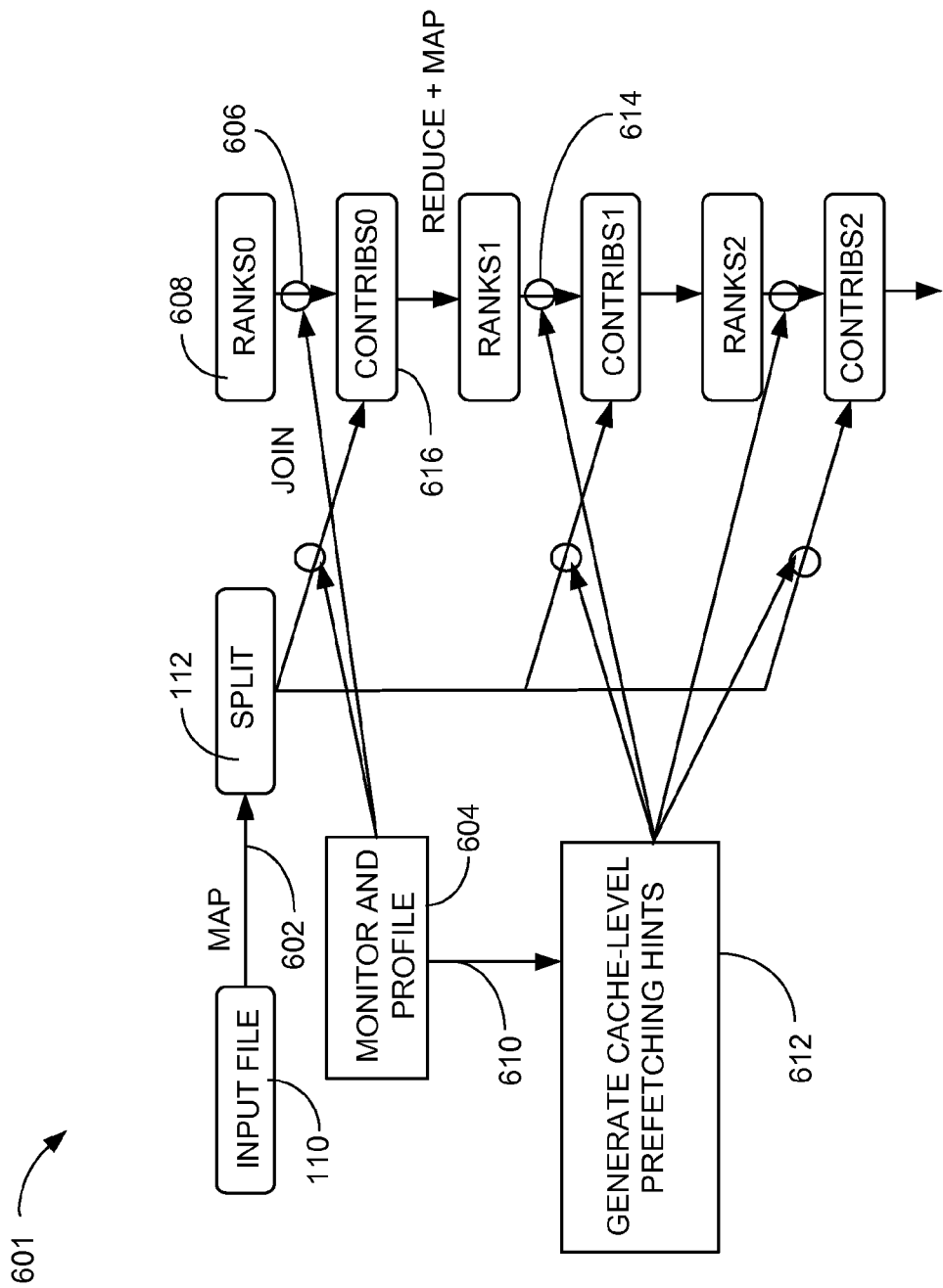
FIG. 6 is an example flow diagram of a prefetching hint generation mechanism in an embodiment.

Referring now to FIG. 6, therein is shown is an example flow diagram of a prefetching hint generation mechanism 601 in an embodiment. The example flow diagram of a prefetching hint generation mechanism 601 depicts an input file 110 that can go through a parsing process 602, which can divide the input file 110 into the splits 112 and deliver the splits 112 to the pre-processing clients 114 of FIG. 1 and the post-processing clients 116 of FIG. 1. For ease of explanation, the process of a single one of the cluster nodes 204 of FIG. 2 is analyzed by using PageRank™ as an example.

In the example, PageRank™ can iteratively evaluate the popularity of web pages by monitoring how many links are directed toward a web page and how many are directed away from the web page. Since the popularity of the web page is a moving target, the process is divided into Contribs(n) 616, which is an indication of the current popularity of the web page as related to all of the other web pages to which it is linked, and ranks(n) 608, which is a probability of landing on the web page based on its current popularity across all of the web pages. The efficiency of the calculations directly impact delivery of web page contents so speed is essential.

One of the splits 112 can be mapped to one of the pre-processing clients 114 for execution. The mapping can initiate a monitor and profile module 604 to generate an initial execution progress 606 in order to calibrate the performance and timing of the one of the pre-processing clients 114 during the execution of the splits 112. The pre-processing clients 114 is assigned to repetitively execute a specific task indicated by the ranks(n) 608, which can be a single execution of the portion of the user program 102 of FIG. 1 assigned to the one of the pre-processing clients 114.

The initial execution progress 606 can be used by the monitor and profile module 604 to pass an expected execution timing 610 to a prefetching hints module 612. Based on the consistent execution of the ranks(n) 608, the prefetching hints module 612 can anticipate accesses to the splits 112 by providing cache-level hints 614 at a timing that can improve the efficiency of the ranks(n) 608.

The contribs(n) 616 can be the output process of the one of the pre-processing clients 114 that is executing the ranks(n) 608. The contribs(n) 616 can transfer the intermediate data 122 of FIG. 1. To the local storage 120 of FIG. 1 and pass control to the next one of the ranks(n) 608 to continue the processing of the splits 112.

It is understood the same process can be applied to the post-processing clients 116 of FIG. 1. The contribs(n) 616 would provide the processed data 119 of FIG. 1 and pass control to the next one of the ranks(n) 608 to continue processing. The execution of the monitor and profile module 604 can be the same for both the pre-processing clients 114 and the post-processing clients 116.

It has been discovered that the monitor and profile module 604 can determine the execution pattern of the ranks(n) 606 to generate the expected execution timing 610 for the prefetching hints module 612. The resultant timing of the cache-level hints 614 can improve the execution of the user program 102.

It has been discovered that the initial execution progress 606, such as static pre-fetching hints, can be monitored and profiled in order to generate the cache-level hints 614, such as dynamic pre-fetching hints, that can be characterized to match the profile of execution indicated by the static pre-fetching hints. The generation of the dynamic pre-fetching hints can be based on the monitoring of the performance of the pre-processing clients 114 and the post-processing clients 116 and how they relate to each other in a deterministic task scheduling process that supports memory-level pre-fetching.

Figure 7:
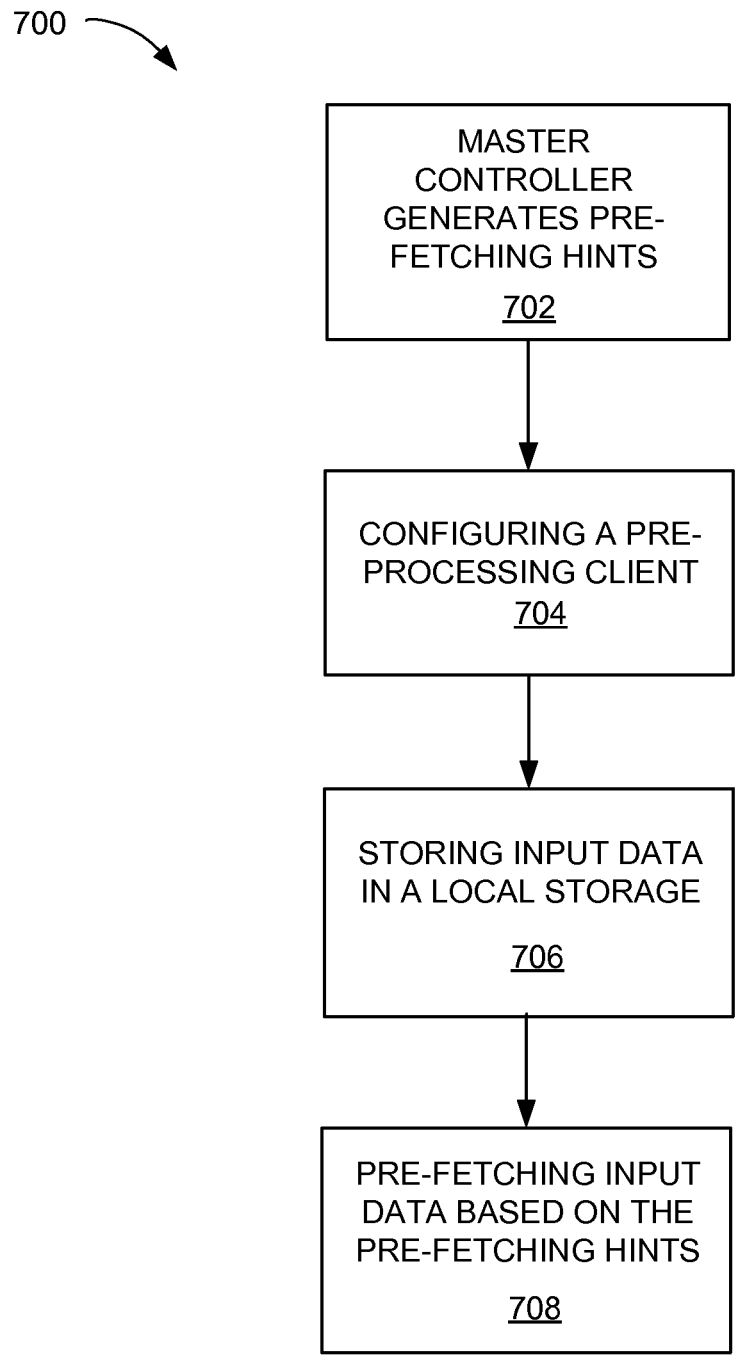
FIG. 7 is a flow chart of a method of operation of an electronic system in a further embodiment of the present invention.

Referring now to FIG. 7, therein is shown a flow chart of a method 700 of operation of an electronic system 100 in a further embodiment of the present invention. The method 700 includes: providing a master controller including: monitoring an execution of a user program by an execution tracker unit and generating a pre-fetching hint by a prefetching commander unit coupled to the execution tracker unit in a process 702; configuring a cluster node, coupled to the master controller, as a pre-processing client in a process 704; storing input data for the user program in a local storage coupled to the cluster node in a process 706; and pre-fetching a split of the input data from the local storage based on the pre-fetching hint sent by the master controller to the pre-processing clients in a process 708.

The method 700 can further include the process 708 managing a node storage engine, by a node pre-fetch engine, for accessing the local storage. The method 700 can further includes the process 704 wherein configuring the pre-processing client includes: executing the user program by a node execution engine; maintaining as status of the user program by a node monitor unit coupled to the node execution engine; and sending a memory-level pre-fetching hint to a node storage engine by a node pre-fetch engine coupled to the node monitor unit. The method 700 can further include the process 702 wherein monitoring the execution of the user program includes performing memory-level pre-fetching by a node storage engine having a cache and a local memory. The method 700 can further include the process 704 wherein configuring the pre-processing client includes: monitoring and profiling a task behavior executed by a node execution engine; and generating a cache-level pre-fetching hint to load a cache page loads from a local dynamic random access memory (DRAM) to a cache.

The method 700 can further include pre-fetching interim data from the local storage based on the pre-fetching hints from the master controller sent to a post-processing client. The method 700 can further include monitoring a program context by constructing a program graph in the execution tracker unit and alerting the pre-fetching commander unit for transferring the pre-fetching hints. The method 700 can further include reducing an I/O bottleneck of the local storage by the pre-processing client including a node storage unit, having a local DRAM and a cache, for transferring the split. The method 700 can further include triggering pre-fetching of intermediate data from the local storage by the cluster node configured as a post-processing client including receiving the pre-fetching hint from the master controller. The method 700 can further include transferring processed data to an output file in the local storage includes the cluster node, coupled to the master controller, configured as a post-processing client including a node storage unit for transferring the processed data.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
 a master controller configured to:
  monitor an execution of a user program,
  manage a pre-processing client during execution of the user program, and
  generate a pre-fetching hint, for the pre-processing client, in anticipation of the execution of a portion of the user program;
 a cluster node, coupled to the master controller, configured to be the pre-processing client;
 a local storage, coupled to the cluster node, configured to store input data for the user program; and
 wherein the master controller is further configured to:
  transfer the pre-fetching hint to the pre-processing clients for pre-fetching a split of the input data from the local storage based on the pre-fetching hint wherein the split is a portion of the input data to be processed by the pre-processing client that had been moved to the local storage before completion of a previous split.

2. The system as claimed in claim 1 wherein the cluster node includes a node storage engine, managed by a node pre-fetch engine, configured to access the local storage and pre-fetching the split based on the pre-fetching hint.

3. The system as claimed in claim 1 further comprising a post-processing client, coupled to the master controller, configured to pre-fetch interim data from the local storage based on the pre-fetching hints from the master controller.

4. The system as claimed in claim 1 wherein the master controller includes an execution tracker unit configured to:
 monitor a program context by constructing a program graph; and
 alert the pre-fetching commander unit for transferring the pre-fetching hints.

5. The system as claimed in claim 1 wherein the cluster node is further configured to:
 execute the user program;
 maintain a status of the user program; and
 send a memory-level pre-fetching hint to a node storage engine.

6. The system as claimed in claim 1 wherein the cluster node includes a node storage engine, including a cache and a local memory, configured to perform memory-level pre-fetching based on input from a node monitor unit.

7. The system as claimed in claim 1 wherein the pre-processing client includes a node monitoring unit coupled to a node pre-fetch engine configured to:
 monitor and profile a task behavior executed by a node execution engine; and
 generate a cache-level pre-fetching hint to load a cache page loads from a local dynamic random access memory (DRAM) to a cache.

8. The system as claimed in claim 1 wherein the pre-processing client includes a node storage unit having a local DRAM and a cache for reducing an I/O bottleneck of the local storage when the split is transferred.

9. The system as claimed in claim 1 wherein the cluster node, coupled to the master controller, configured as a post-processing client includes the pre-fetching hint triggering pre-fetching of intermediate data from the local storage.

10. The system as claimed in claim 1 wherein the cluster node, coupled to the master controller, configured as a post-processing client includes a node storage unit configured to transfer processed data to an output file in the local storage.

11. A method of operation of an electronic system comprising:
 monitoring an execution of a user program by an execution tracker unit,
 managing a pre-processing client, by a master controller, during execution of the user program, and
 generating a pre-fetching hint, by a prefetching commander unit, based on the monitoring by the execution tracker unit for anticipating the execution of a portion of the user program;
 configuring a cluster node, by parsing the user program, as the pre-processing client;
 storing input data for the user program in a local storage; and
 pre-fetching a split of the input data from the local storage based on the pre-fetching hint sent to the pre-processing clients wherein the split is a portion of the input data to be processed by the pre-processing client that had been moved to the local storage before completion of a previous split.

12. The method as claimed in claim 11 wherein pre-fetching the split based on the pre-fetching hint includes managing a node storage engine, by a node pre-fetch engine, for accessing the local storage.

13. The method as claimed in claim 11 further comprising pre-fetching interim data from the local storage based on the pre-fetching hints from a master controller sent to a post-processing client.

14. The method as claimed in claim 11 further comprising monitoring a program context, of the user program, by constructing a program graph in the execution tracker unit and alerting the pre-fetching commander unit for transferring the pre-fetching hints.

15. The method as claimed in claim 11 wherein configuring the pre-processing client includes:
 executing the user program by a node execution engine;
 monitoring a status of the user program by a node monitor unit coupled to the node execution engine; and
 sending a memory-level pre-fetching hint to a node storage engine by a node pre-fetch engine coupled to the node monitor unit.

16. The method as claimed in claim 11 wherein monitoring the execution of the user program includes performing memory-level pre-fetching by a node storage engine having a cache and a local memory.

17. The method as claimed in claim 11 wherein configuring the pre-processing client includes:
 monitoring and profiling a task behavior executed by a node execution engine; and
 generating a cache-level pre-fetching hint to load a cache page load from a local dynamic random access memory (DRAM) to a cache.

18. The method as claimed in claim 11 further comprising reducing an I/O bottleneck of the local storage by the pre-processing client including a node storage unit, having a local DRAM and a cache, for transferring the split.

19. The method as claimed in claim 11 further comprising triggering pre-fetching of intermediate data from the local storage by the cluster node configured as a post-processing client includes receiving the pre-fetching hint from a master controller.

20. The method as claimed in claim 11 further comprising transferring processed data to an output file in the local storage including the cluster node, coupled to a master controller, configured as a post-processing client including a node storage unit for transferring the processed data.

* * * * *